(12) United States Patent
Cazier et al.

(10) Patent No.: US 6,927,795 B1
(45) Date of Patent: Aug. 9, 2005

(54) DARK SIGNAL CLOSED LOOP THERMAL CONTROL FOR DIGITAL IMAGING SYSTEMS

(75) Inventors: Robert Cazier, Fort Collins, CO (US); David J Staudacher, Ft Collins, CO (US); Christopher A. Whitman, Fort Collins, CO (US)

(73) Assignee: Hewlett-Packard Development Company, LP, Houston, TX (US)

( * ) Notice: Subject to any disclaimer, the term of this patent is extended or adjusted under 35 U.S.C. 154(b) by 873 days.

(21) Appl. No.: 09/592,483

(22) Filed: Jun. 9, 2000

(51) Int. Cl.[7] .............................................. H04N 9/64
(52) U.S. Cl. ..................................... 348/243; 348/244
(58) Field of Search ................................. 348/243–248

(56) References Cited

U.S. PATENT DOCUMENTS

| | | | | |
|---|---|---|---|---|
| 4,562,473 A | * | 12/1985 | Levine | 348/244 |
| 4,587,563 A | * | 5/1986 | Bendell et al. | 348/244 |
| 4,600,946 A | * | 7/1986 | Levine | 348/616 |
| 4,760,453 A | * | 7/1988 | Hieda | 348/243 |
| 4,910,598 A | * | 3/1990 | Itakura et al. | 348/247 |
| 5,796,430 A | * | 8/1998 | Katoh et al. | 348/246 |
| 6,249,647 B1 | * | 6/2001 | Cazier et al. | 396/97 |
| 6,271,880 B1 | * | 8/2001 | Kameshima et al. | 348/244 |
| 6,525,769 B1 | * | 2/2003 | Thomas et al. | 348/243 |

FOREIGN PATENT DOCUMENTS

JP   06062292 A  *  3/1994  .......... H04N 5/225

OTHER PUBLICATIONS

Cazier, et al.; "Compensation For Thermal Degradation Of The Optical Performance In A Digital Imaging System;" Jun. 8, 1999; Pending Patent Application Serial No. 09/327992.

* cited by examiner

Primary Examiner—Aung Moe

(57) ABSTRACT

This invention is a digital camera that measures its internal temperature using the dark current of the photo detector. Using the temperature information the digital camera controls its internal temperature by selectively shutting down or slowing down heat generating components.

6 Claims, 1 Drawing Sheet

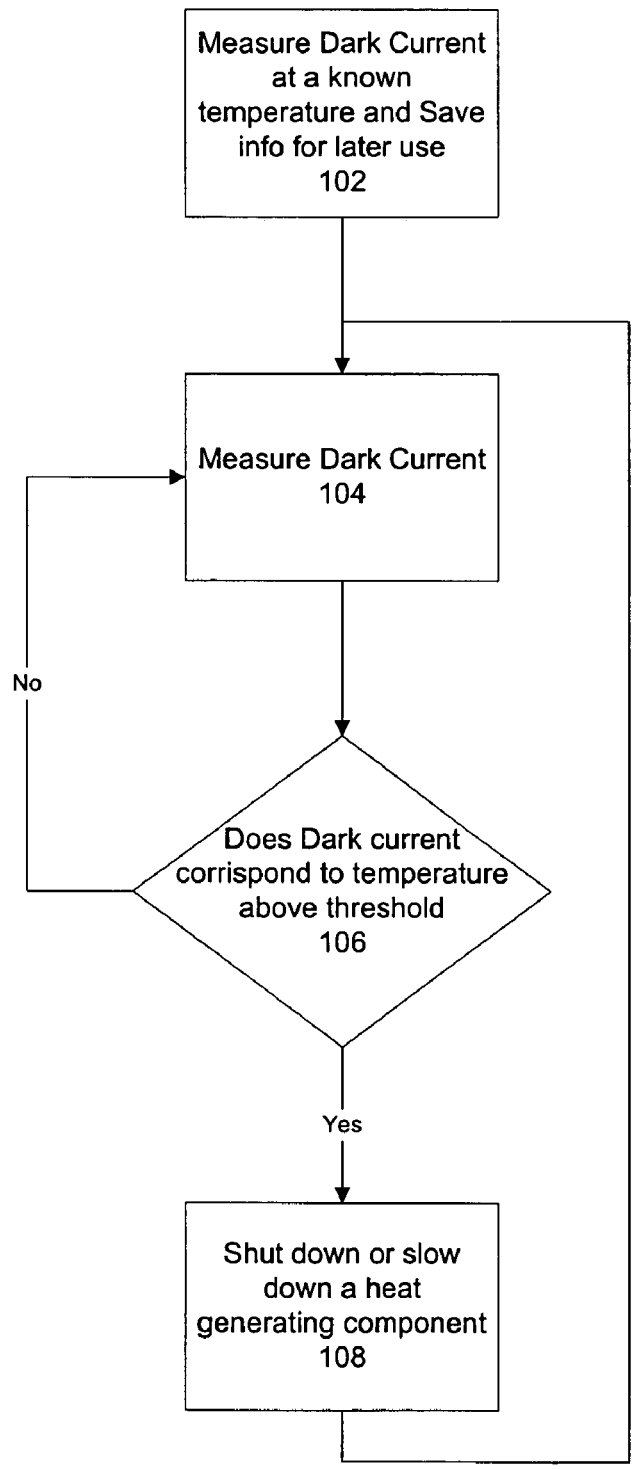
The Figure

DARK SIGNAL CLOSED LOOP THERMAL CONTROL FOR DIGITAL IMAGING SYSTEMS

FIELD OF THE INVENTION

The field of this invention is a digital camera and more specifically a digital camera that measures its internal temperature using the dark current of the photo detector. Using the temperature information the digital camera controls its internal temperature by selectively shutting down or slowing down heat generating components.

BACKGROUND OF THE INVENTION

Digital cameras typically have a lens system, a photo detector (typically a charged coupled device CCD), a microprocessor, a display device (typically a liquid crystal display), a storage device, an image processing device (typically an ASIC or a DSP) and other components. Typically most of these components generate heat when operating. Some components generate more heat than other components.

The photo detectors used in typical digital cameras are sensitive to temperature. One of these sensitivities for the photo detector is the generation of noise. The higher the temperature of the photo detector the more noise that is created by the photo detector. When the temperature gets higher than some threshold temperature, the image created by the digital camera becomes visibly degraded. Other components in the digital camera are also sensitive to temperature, for example the analog-to-digital (A-to-D) converters, the liquid crystal display (LCD), the microprocessor, and the lens system.

Because of these temperature sensitivities, digital cameras may be programmed to control the temperature inside the camera by shutting down components that generate heat. Two methods are currently used to decide when to shut down heat generating components. The first method measures the total time that the components have been running. After some preset time, the heat generating components are turned off. This method does not take into account the temperature of the environment in which the camera is being used. Digital cameras are used in a wide variety of temperature conditions ranging from very hot on a summer day to very cold on a winter's day. When the camera is being used on a cold winter day the heat generating components may be shut down well before the photo detector of the camera gets too hot. Another problem with this method is camera cycling. When the user shuts the camera off and then restarts the camera within a short time (camera cycling) the total time measured for a heat-generating component may be reset. When the camera cycling time is shorter than the preset time, the heat-generating component will never be shut off.

The second method measures the inside temperature of the digital camera with a thermal couple. When the temperature measured by the thermal couple reaches a threshold value the camera either shuts down or slows down some heat generating components or the camera warns the user. This method has three problems. The first problem is that a thermal couple costs money. The second problem is that the thermal couple takes up room inside the camera. The third problem is that distance or various other internal structures will typically thermally separate the thermal couple from the photo detector. Due to this thermal separation the thermal couple does not give an accurate reading of the temperature of the photo detector. The photo detector is one of the most thermal sensitive components in digital imaging systems so it is important to accurately determine the temperature of the photo detector.

There is a need for a digital imaging system that can accurately and inexpensively determine and control the temperature of the photo detector.

SUMMARY OF THE INVENTION

A system for thermal control in a digital imaging device can improve the performance of the digital imaging system. The dark current from the photosensor is used to measure the temperature of the photo detector. The digital processing system can use the temperature information to control heat generation by selectively shutting down heat generating components.

BRIEF DESCRIPTION OF THE DRAWINGS

The FIGURE shows a block diagram of a system for temperature control in accordance with the present invention.

DETAILED DESCRIPTION OF THE PREFERRED EMBODIMENT

A system for thermal control in a digital imaging device can improve the performance of the digital imaging system. Digital imaging systems such as digital cameras and scanners typically have a photo detector to convert the image of the object into electronic form. Typically the photo detector in digital cameras and scanners are charged coupled devices (CCD). Scanners have linear arrays of photo detector and digital cameras have area arrays of photo detectors. The output of a photo detector is made up of two components. The main component is a signal that is proportional to the intensity of light hitting each photo detector element, integrated over a fixed time. There is also a leakage current component. The leakage current component is commonly known as dark current because the photo detector produces the leakage current even in the absence of light. The dark current is the charge accumulated on the photo detector during a fixed time, typically the same time that is used for the normal exposure plus readout time. The dark current is dependent on the temperature of the photo detector. Typically the dark current will double for every 7–8 degree C. change in temperature. Once the dark current for a photo detector at a given temperature is known, the present temperature of the photo detector can be determined. For example, when a photo detector has a dark current of 10 milliamps at 25 degrees C., the temperature of the photo detector when the dark current is 20 milliamps could be determined by the formula $$T_c = \frac{8I_c}{2I_B} + T_B.$$

Where $T_c$ is the present temperature, $I_c$ is the present dark current, $I_B$ is the known dark current at the given temperature $T_B$. The temperature of the photo detector is 33 degrees C. when the dark current is 20 milliamps (33=((8*20)/(2*10)) +25).

Typically the image signal created by the photo detector is converted to digital form using an analog-to-digital converter. The digital signal can then be manipulated or measured by the processor inside the camera. The dark current can be converted with the same analog-to-digital converter that is used to convert the image signal. Once the dark current has been converted into digital form the processor can measure the dark current. The dark current can be created in a digital camera by either having pixels on the photo detector that are permanently covered by an opaque material or taking a measurement when the shutter is closed. The dark current can be created in a scanner with pixels on the photo detector that are permanently covered or by taking a measurement with the carriage under the top cover of the scanner. To determine the dark current at a known temperature the digital imaging system can be placed in a chamber at a known temperature or an auxiliary thermometer can be temporarily placed onto the system while a dark current measurement is done. This measured dark current at a known temperature is stored for later use.

The FIGURE shows a flow chart of one embodiment of the present invention. The first step is to measure the dark current of the photo-sensor at a known temperature and save that information away for use at a later time (102). Once the digital imaging system is in use the dark current can be measured on a periodic basis (104). When the measured dark current is above a threshold current the performance of a heat-generating component can be altered by shutting down (108) or slowing down the component. The threshold for the dark current can correspond to the highest temperature at which the photo-sensor should be operated. When all of the potential heat generating components have been shut down, the digital imaging device could warn the user that the digital imaging system is too hot. The user could be presented with a choice of continuing to use the digital imaging system with a reduction in quality or not using the digital imaging system until a cooler temperature has been reached.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for thermal control of a digital imaging system comprising:
   measuring a first dark current of the photo detector at a known temperature;
   measuring a second dark current of the photo detector; and
   calculating the temperature of the digital imaging system based on the first and second dark currents; and
   reducing the temperature of at least one component in the digital imaging system if the calculated temperature is greater than a preselected value.

2. The method of claim 1, wherein the photo detector is a CCD.

3. A method of operating a digital imaging device, said method comprising:
   measuring a first dark current of at least one photo detector associated with said digital imaging device;
   measuring a second dark current when said at least one photo detector is at a preselected temperature;
   calculating the temperature of said at least one photo detector based on said first dark current and said second dark current; and
   altering the performance of at least one device associated with said digital imaging device based on said temperature.

4. The method of claim 3 and further comprising first photo detector of said at least one photo detector that is situated within said digital imaging device so as not to receive light, and wherein said measuring comprises measuring a first dark current of said first photo detector.

5. The method of claim 3, wherein said digital imaging device comprises a shutter, wherein said shutter controls the light received by said at least one photo detector, and wherein said measuring comprises closing said shutter and measuring a first dark current of said at least one photo detector.

6. The method of claim 3, wherein said first dark current changes a preselected amount for a preselected change in temperature, and wherein said calculating comprises calculating the temperature of said at least one photo detector by measuring the difference between said first current and said second current, wherein said temperature of said at least one photo detector is proportional to said difference.

* * * * *